(12) United States Patent
Salmela

(10) Patent No.: US 6,361,237 B1
(45) Date of Patent: Mar. 26, 2002

(54) COUPLING DEVICE

(75) Inventor: Gordon O. Salmela, Framingham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/443,531

(22) Filed: Nov. 19, 1999

(51) Int. Cl.$^7$ ................................................ H01Q 3/02
(52) U.S. Cl. ............................ 403/81; 403/34; 403/52; 285/121.3; 343/763; 343/875
(58) Field of Search .............................. 403/81, 82, 52, 403/34, 37, 38, 146; 285/120.1, 121.1, 121.3, 124.1, 121.6, 119, 184; 174/60, 64, 65 R, 34; 343/763, 757, 766, 875; 333/261

(56) References Cited

U.S. PATENT DOCUMENTS

| | | | | |
|---|---|---|---|---|
| 3,026,129 A | * | 3/1962 | Courtot et al. .............. | 285/184 |
| 3,322,886 A | * | 5/1967 | Warshawsky ................ | 403/146 |
| 3,789,415 A | * | 1/1974 | Vickland ..................... | 343/763 |
| 3,909,047 A | | 9/1975 | Salmela | |
| 4,183,559 A | * | 1/1980 | Stafford et al. .......... | 285/121.6 |
| 4,597,595 A | * | 7/1986 | Wallace ....................... | 285/119 |
| 4,643,462 A | * | 2/1987 | Wallace ....................... | 285/119 |
| 5,003,320 A | | 3/1991 | Miranda | |

* cited by examiner

Primary Examiner—Lynne H. Browne
Assistant Examiner—Doug Hutton
(74) Attorney, Agent, or Firm—Iandiorio & Teska

(57) ABSTRACT

A coupling device includes first and second relatively rotating members mounted about a common axis and first and second lines fixed between the first and second members. The first line is adapted to wrap around the first member in a first direction and around the second member in a second direction, opposite the first direction, the second line is adapted to wrap around the first member in the second direction and around the second member in the first direction. A guide is revolvably mounted to the first and second members for translating the first and second lines between the first member and the second member as the first and second members rotate relative to each other.

62 Claims, 13 Drawing Sheets

COUPLING DEVICE

FIELD OF INVENTION

This invention generally relates to a coupling device for connecting lines between relatively rotating members, and more particularly to a coupling device for directing the passage of lines between a non-rotating antenna base structure and a rotating antenna which provides increased rotational travel while minimizing stress on the lines.

BACKGROUND OF INVENTION

In the field of large rotating antennas, a problem exists in supplying the large number of lines, such as cables and hoses, between the steerable antenna and the non-moving base. If a cable is routed directly on the azimuth axis, then antenna motion imposes only twisting along the cable, without the cable having to follow the arc traced by a point off the axis. Thus, the more central the cable location, the more gentle the cable motion during rotation and therefore, the less the cable will wear. As a result, a common practice is to run all lines through the central hole in the main bearing axis of the antenna. Although these large scale antennas have very large diameter center holes, the center hole can be crowded with many cables, hoses and power connections, plus an encoder drive shaft for the azimuth angle encoder. Typically, the antenna is designed such that the center area of the center hole houses the encoder drive shaft, the next concentric layer houses the electrical cables and coaxial cables and the outermost layer within the center hole houses the cooling hose connections. That design segregates each of the three functional groups to protect the sensitive high-voltage cables and the encoder drive shaft from contact with the cooling water hoses. The electrical cabling associated with the antenna is afforded as long a length as possible within the structure on which the antenna is mounted in order to reduce the severity of bending and twisting imparted to the cables.

However, the cooling hoses, which in some cases can be on the order of 5" in diameter, cannot tolerate any twists along their axes. Therefore, a device is needed which handles the cooling hoses in such a way as to allow the antenna to be rotated at least 440° without unduly twisting, bending or otherwise stressing the cooling hoses.

Some prior art arrangements which attempt to address this problem include a flat spiral, a flat bend with swivels, a vertical drape with swivels, and a flat coil with vertical drape for slack take-up. The flat spiral looks like a watch spring, and winds and unwinds the hose to follow the antenna motion. However, to obtain the required 440° of minimum travel, a hose length of roughly 100 times the hose diameter is required when using the flat spiral arrangement. The flat bend arrangement and the vertical drape arrangement both require increased floor space around the axis of the antenna to accommodate the slack which is produced in the hose as the antenna rotates, and both arrangements require the use of swivel end connections to negate twisting of the hose. These connections, however, tend to leak thus reducing the reliability of the swivel end connection arrangement. The flat coil with vertical drape for slack take-up arrangement is a variation of the flat spiral in which the spiral stays tight against the rotating housing, and pays out or reels in the hose on a tangent as the antenna rotates. The surplus hose is collected in a vertical drape, the length of which changes to maintain some tension on the spiral. This arrangement has no swivel end connections, but unfortunately requires excessive hose lengths and increased floor space around the housing of the antenna.

SUMMARY OF THE INVENTION

It is therefore an object of this invention to provide an improved device for coupling one or more lines between relatively rotating structures.

It is a further object of this invention to provide such a coupling device which requires a minimum length of the lines and a minimum of operating area.

It is a further object of this invention to provide such a coupling device which effectively reduces or eliminates twisting, bending and tension in the lines.

It is yet a further object of the invention to provide such a coupling device which enables increased travel of a rotating antenna.

The invention results from the realization that a coupling apparatus for coupling a line including cables, conduits and the like between rotatable members capable of limited relative rotation which enables increased travel while minimizing twisting, bending and tension to avoid fatigue can be achieved by connecting the line between the two relatively rotatable members and using a guide to reverse direction of the line between those members so that it wraps the lines around the members in opposite directions to maintain slack control of the line.

This invention features a coupling apparatus including first and second relatively rotatable members, a first line fixed with a first of the relatively rotatable members and wrapped around it in a first direction, a guide revolvable about the relatively rotatable members for reversing direction of the first line to the second relatively rotatable member, the line being wrapped around the second relatively rotatable member in the opposite direction and fixed with it and a drive mechanism for rotating the guide for maintaining a slack control of the line between the relatively rotatable members.

In a preferred embodiment, the drive mechanism may include a second line fixed with each of the first and second relatively rotatable members and wrapped around them in the opposite direction from the first line and the guide reverses direction of the second line between the first and second relatively rotatable members. The guide may revolve at less than the speed of relative rotation between the relatively rotatable members, the speed of the guide being a function of the ratio of the radii of the first and second relatively rotatable members. The guide may include a bearing device mounted on one member and a second bearing device mounted on the other member. The line may include a conduit or a cable. The guide may include a curved track which may be "C" shaped. The curved track may include at least one roller or it may include a low friction element.

The invention also features a coupling device including first and second relatively rotating members mounted about a common axis, first and second lines fixed between the first and second members, the first line being adapted to wrap around the first member in a first direction and around the second member in a second direction, opposite the first direction, the second line being adapted to wrap around the first member in the second direction and around the second member in the first direction and a guide revolvably mounted between the first and second members for translating the first and second lines between the first member and the second member as the first and second members rotate relative to each other.

In a preferred embodiment, the guide may include first and second opposing pulley devices, the first pulley device translating the first line between the first and second members and the second pulley device simultaneously translating the second line between the first and second members. The first and second pulley devices may change the direction of the first and second lines respectively, as they are translated between the first and second members. When the second member rotates in the first direction relative to the first member, the guide may translate the first line from the second member to the first member and the second line from the first member to the second member. When the second member rotates in the second direction relative to the first member, the guide may translate the first line from the first member to the second member and the second line from the second member to the first member.

This invention also features a coupling device including first and second relatively rotating members mounted to rotate about a common axis, a first line fixed between the first and second members, the first line being adapted to wrap around the first member in a first direction and around the second member in a second direction, opposite the first direction, a guide revolvably mounted to the first and second members for translating the first line between the first and second members, as the first and second members rotate relative to each other and a drive mechanism for revolving the guide around the common axis at a rate which is less than the relative rate of rotation of the first and second members.

In a preferred embodiment, the guide may reverse the direction of the first line from the first direction to the second direction as it translates the first line from the first member to the second member. The drive mechanism may include a second line fixed between the first and second members, the second line being adapted to wrap around the first member in the second direction and around the second member in the first direction, the guide translating the second line between the first and second members as the first and second members rotate relative to each other. The guide may reverse the direction of the second line from the second direction to the first direction as it translates the second line from the first member to the second member. The guide may include a first pulley device for reversing the direction of the first line and the may guide include opposing pulley devices for simultaneously reversing the direction of the first and second lines. The first and second members each may include a flange for supporting the first line as it is wrapped around the first and second members.

BRIEF DESCRIPTION OF THE DRAWINGS

Other objects, features and advantages will occur to those skilled in the art from the following description of a preferred embodiment and the accompanying drawings, in which.

Throughout the various views shown in the figures, identical elements of the invention are indicated by identical reference numerals and similar elements of the invention are indicated by primed referenced numerals.

DETAILED DESCRIPTION

Figure 1:
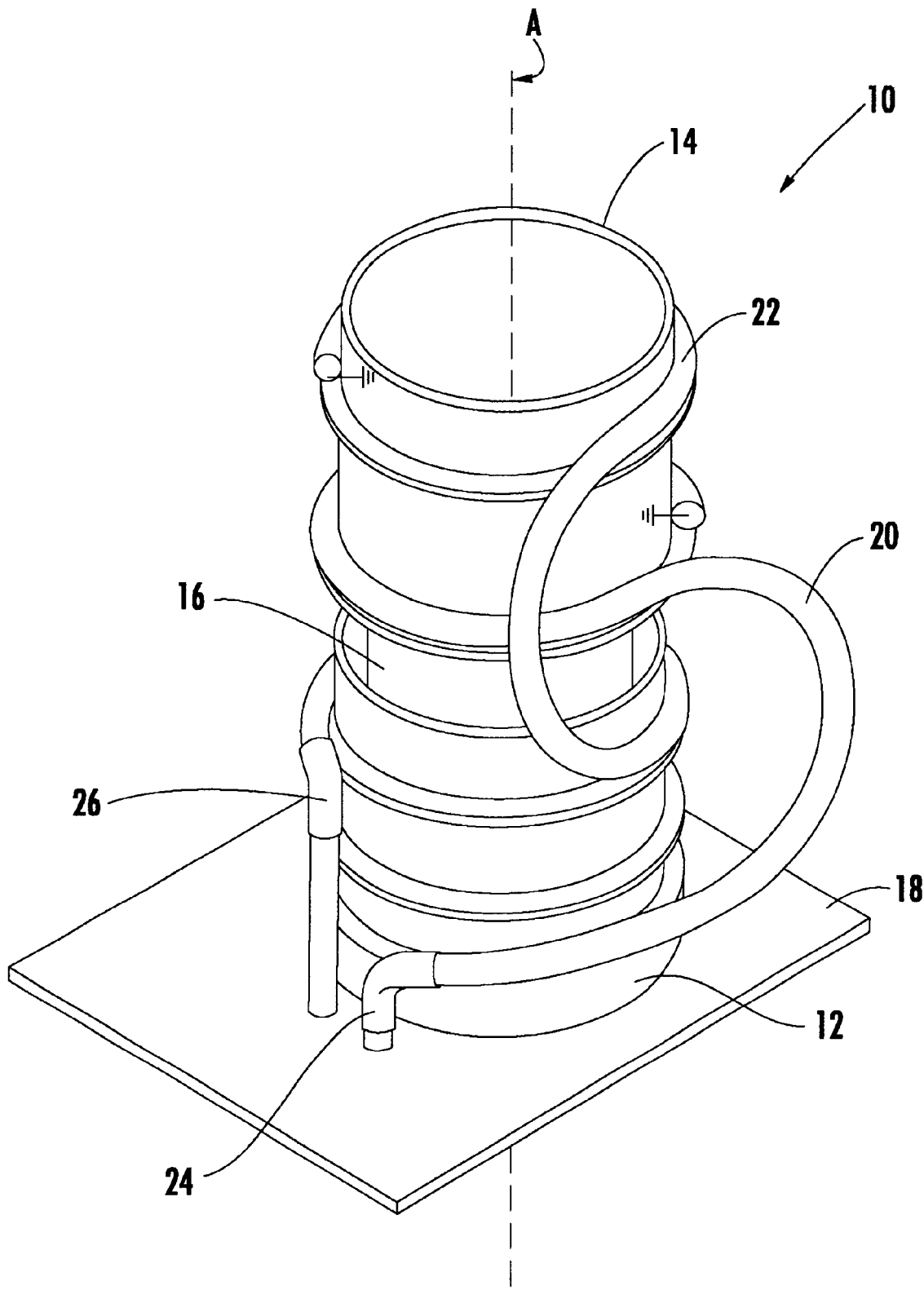
FIG. 1 is a schematic diagram showing a three-dimensional view of the upper and lower housings and the first and second lines in accordance with the present invention.

The coupling device of the present invention schematically shown at 10 in FIG. 1 includes a lower housing 12 and an upper housing 14 which are mounted on a core 16 to rotate relative to each other about a longitudinal axis A. With respect to the present invention, relative rotation refers to the case in which both the upper and lower housings are rotating in opposite directions with respect to each other, and the case in which one of the housings is rotating and the other housing is fixed to a stationary surface. The latter case is involved when the present invention is used in conjunction with a rotating antenna, as described above, wherein the lower housing 12 is fixed to the top of a tower or a rooftop of a building, and the upper housing 14 is free to rotate about axis A.

As shown in FIG. 1, line 20 is fixed to the stationary surface 18 at a fitting 24 and is coupled between the lower housing 12 and the upper housing 14 and fixed relative to the upper housing 14. Line 20 is arranged on the device 10 such that it wraps around the lower housing 12 in a first direction, counterclockwise in FIG. 1, turns 180° and wraps around the upper housing 14 in a second direction, which is clockwise. Likewise, line 22 is fixed to the stationary surface 18 at a fitting 26 and is coupled between the lower housing 12 and the upper housing 14 and fixed relative to the upper housing 14. However, the line 22 is arranged on the device 10 such that it wraps around the lower housing 12 in the second direction, clockwise in FIG. 1, turns 180° and wraps around the upper housing 14 in the first direction or counter clockwise. Lines 20 and 22 referred to in this description can be any type of flexible conduit or cable.

Figure 2:
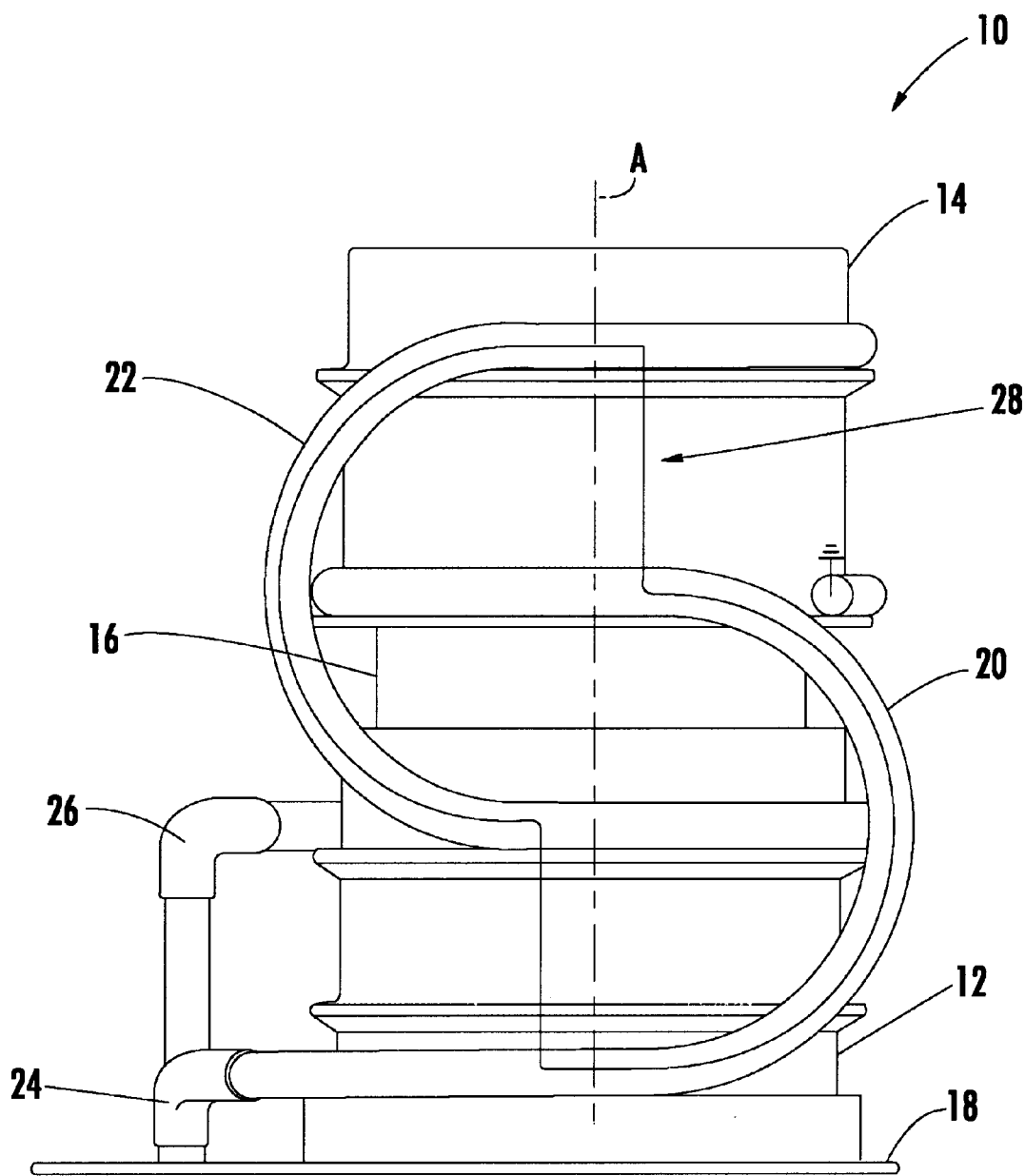
FIG. 2 is a schematic diagram showing a side view of the guide mounted to the upper and lower housings and the first and second lines in accordance with the present invention.

This configuration, when used in conjunction with the revolving guide assembly 28, shown schematically in FIG. 2 and described in further detail below, allows relative rotation between the upper and lower housings 12 and 14, while maintaining a slack control of the lines 20 and 22. Guide assembly 28 maintains the position and controls the slack of each line 20 and 22 as it revolves around the coupling device, as will be described below. Guide 28 is shown in more detail in FIG. 3, which is a front view of the guide assembly, shown removed from the housings 12 and 14; and FIG. 4, which is a side-sectional view of the guide assembly, taken along line 4—4 of FIG. 3.

Figure 4:
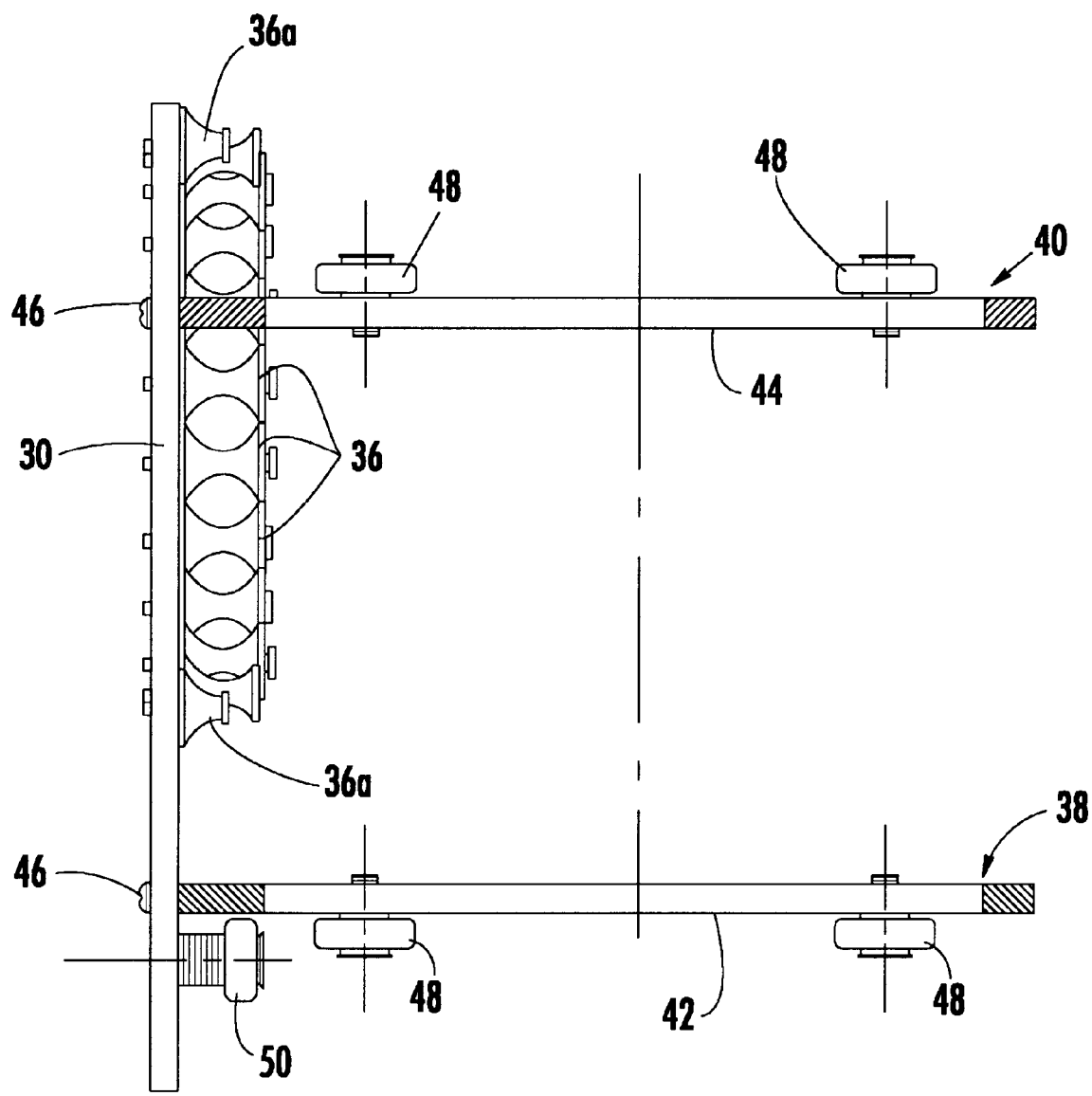
FIG. 4 is a side sectional view of the rotor assembly taken along line 4—4 of FIG. 3.

In the preferred embodiment, the guide assembly 28 includes a plate 30, a first pulley device 32 and a second pulley device 34. While these portions of the guide assembly 28 are referred to as pulley devices and a variety of structures may be used, including the roller structure shown in FIG. 6, the open conduit structure shown in FIG. 10 and the closed conduit shown in FIG. 11, the function of each structure is the same, in that it acts like a pulley. For clarity, plate 30 is shown as being transparent, although this is not necessary to the invention. Pulley devices 32 and 34 each include a series of rollers 36 rotatably mounted on the plate 30 in a "C" configuration, with each of the apexes 33 and 35 of the "C" of the pulley devices facing away from each other in the plane of plate 30. As can be seen in FIG. 4, the rollers 36 have an hourglass shape, except for the end rollers 36a, which are approximately half the length of the rollers 36. This shape of the rollers 36 and 36a facilitates the handling of the lines 20 and 22 by the guide assembly 28.

Figure 3:
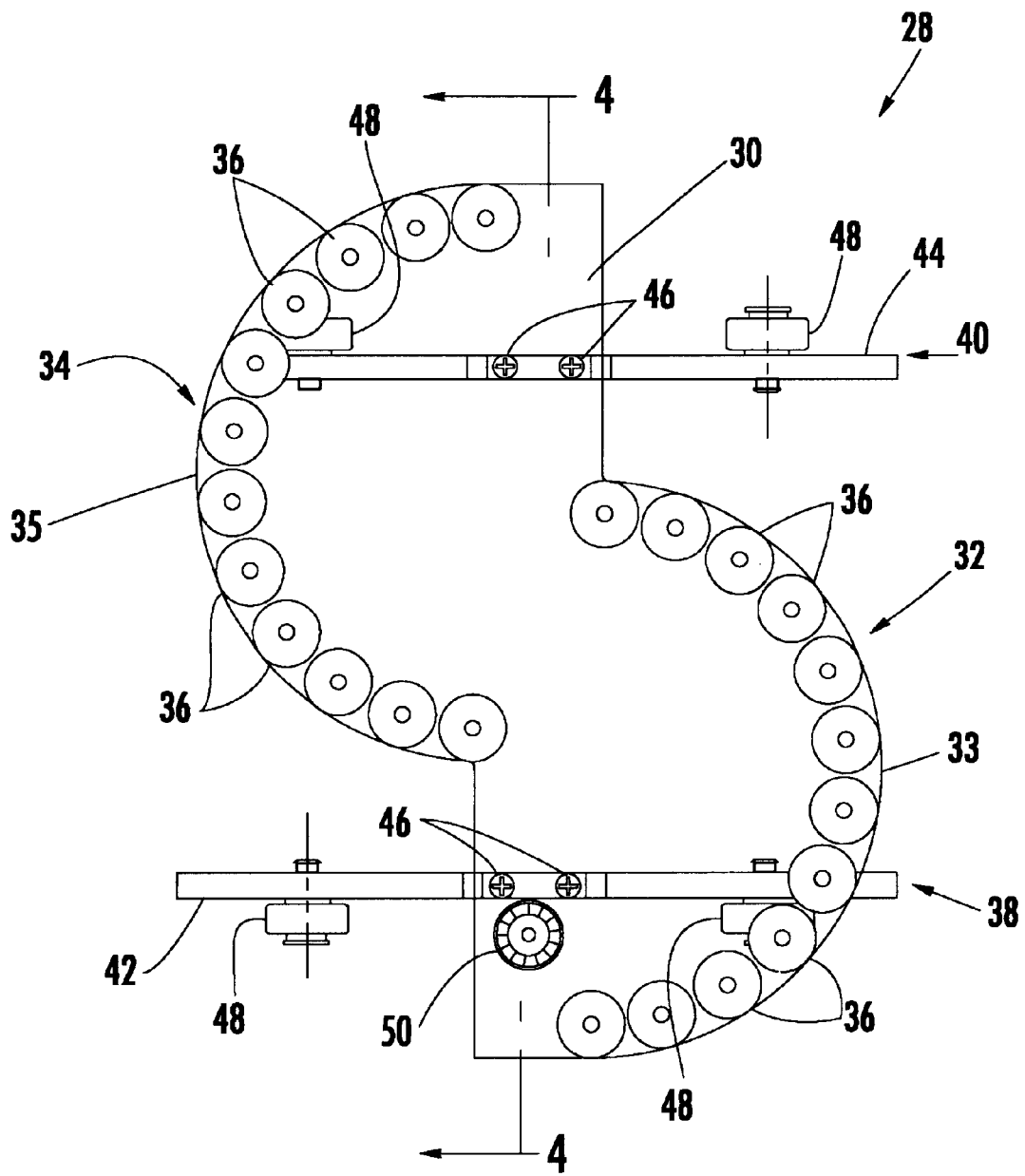
FIG. 3 is a diagrammatic front view of the guide assembly in accordance with the present invention.
Figure 5:
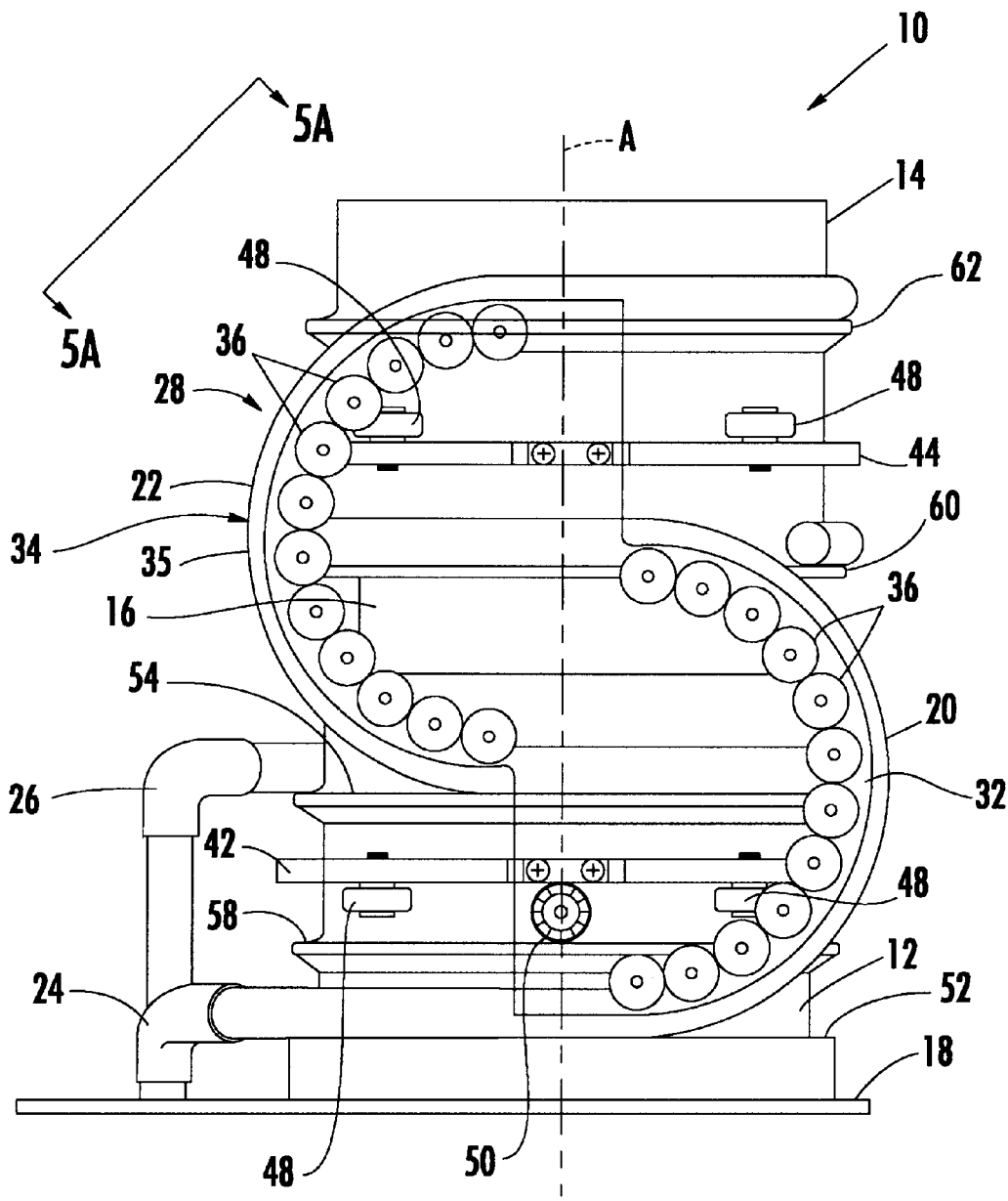
FIG. 5 is a front view of a coupling device in accordance with the present invention.

Guide assembly 28 also includes lower and upper bearing assemblies 38 and 40, each including a bearing support ring 42 and 44, respectively. Bearing support rings 42 and 44 are annular in shape and have a diameter that enables them to be rotatably mounted around the lower and upper housings 12 and 14, respectively, as shown in FIG. 5. Bearing support rings 42 and 44, FIGS. 3 and 4, are attached to plate 30 by conventional fastening devices, such as screws 46. Roller bearings 48 are mounted to the bearing support rings 42 and 44 to facilitate the rotation of the guide assembly around the housings 12 and 14. Roller bearing 50 is mounted to plate 30 to support the guide assembly along the rotation axis A. Roller bearings 48 and 50 are preferably ball bearing devices, although it will be understood that any type of bearing may be used to facilitate the rotation of the guide assembly 28.

As shown in FIG. 5, which is a front view of the coupling device 10 of the present invention, lower housing 12 includes a lower line support flange 52, for supporting the line 20 and an upper line support flange 54 for supporting the line 22. Upper housing 14 includes a lower line support flange 60 for supporting the line 20 and an upper line support flange 62 for supporting the line 22. Guide assembly 28 is rotatably mounted to the housings 12 and 14 such that roller bearing 50 rides on bearing flange 58 to maintain the vertical positioning of the guide assembly 28 with respect to the housings 12 and 14.

Figure 6:
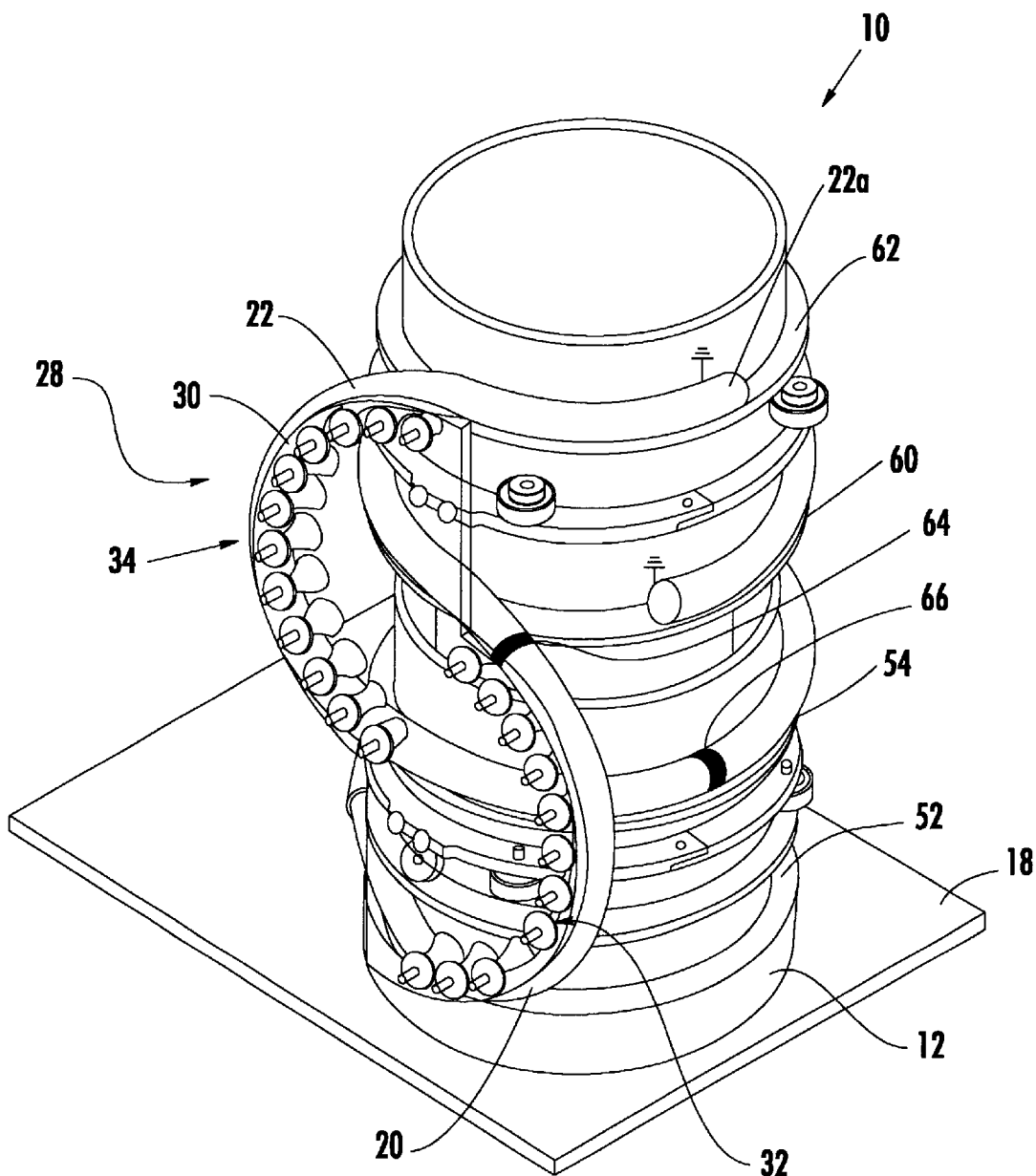
FIGS. 6, 7 and 8 are a series of views of the coupling device in accordance with the present invention, shown at different stages of rotation of the coupling device.
Figure 7:
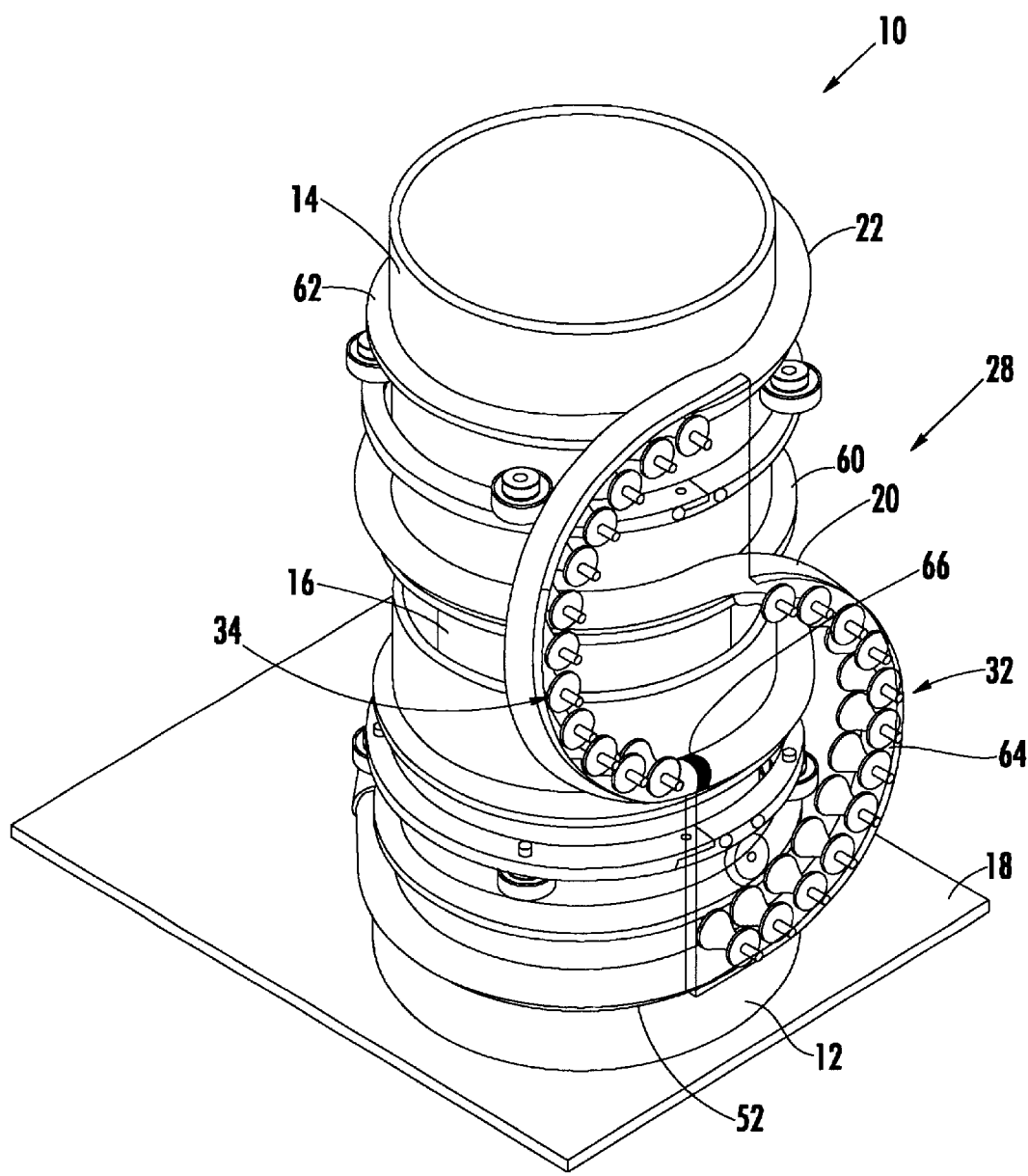
Figure 8:
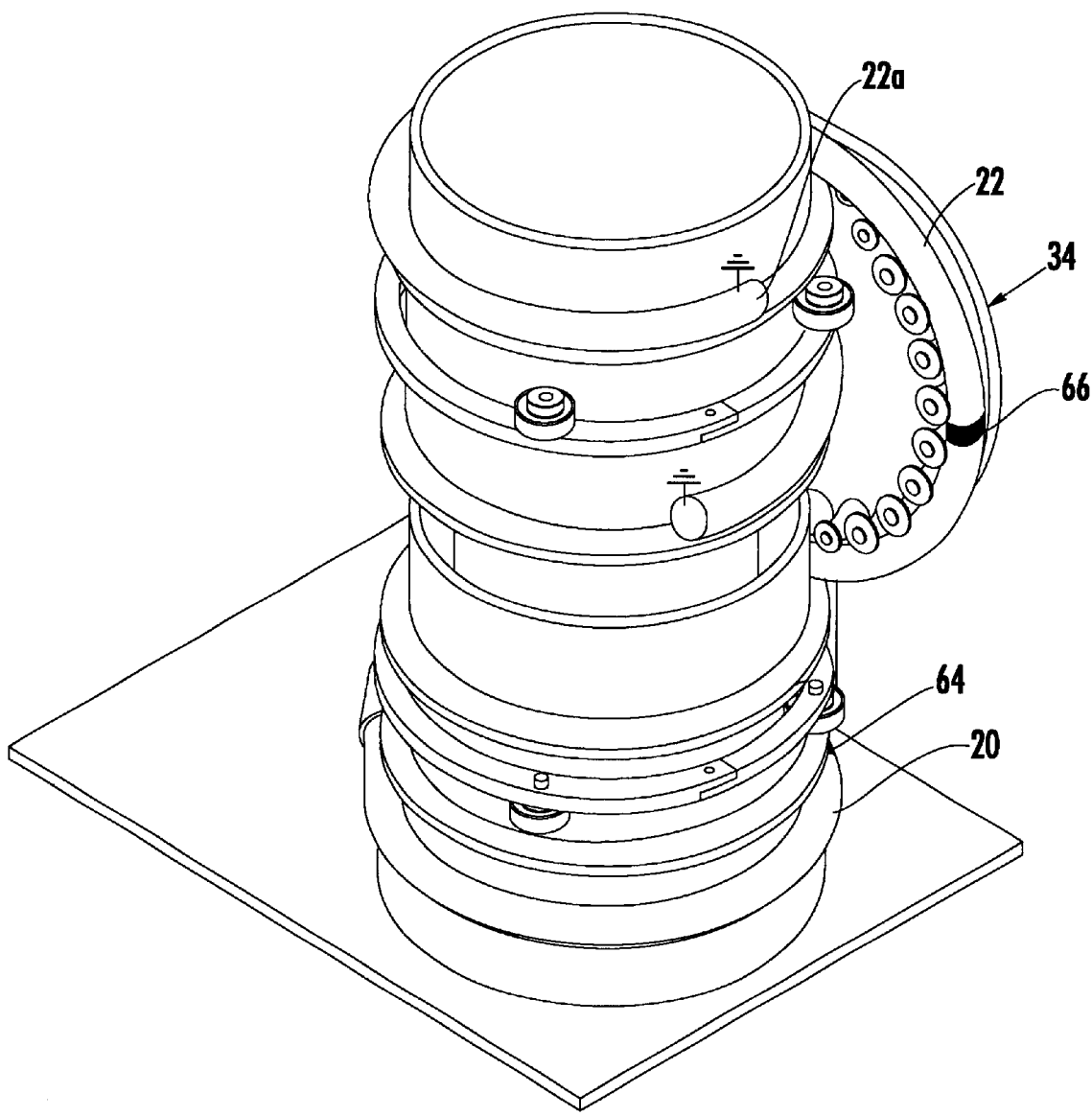

The operation of the coupling device 10 will now be described with reference to FIGS. 6–8, which are a series of three-dimensional views of the coupling device, shown at different stages of relative rotation of the housings 12 and 14. In these figures, line 20 is marked with a hash mark 64 and line 22 is marked with a hash mark 66. These hash marks 64 and 66 will be used to describe the operation of the coupling device 10. As shown in FIG. 6, hash mark 64 of line 20 is located at the upper end of first pulley device 32 and hash mark 66 of line 22 is located on upper line support ridge 54 of lower housing 12. For the purposes of this description, lower housing 12 is fixed to the stationary surface 18, so that only upper housing 14 rotates, resulting in relative rotation between the lower and upper housings 12 and 14. Since line 22 is fixed to the upper housing 14, the rotation of the upper housing 14 in the counterclockwise direction causes line 22 to pull the second pulley device 34, causing the guide assembly 28 to revolve around the housings 12 and 14 in the counterclockwise direction. As the guide assembly 28 revolves around the housings 12 and 14 in the counterclockwise direction, first pulley device 32 pulls the line 20 from the lower line supporting flange 60 of upper housing 14 and places it on the lower line supporting flange 52 of lower housing 12, thereby transferring the line 20 from the upper housing 14 to the lower housing 12. Concurrently, line 22 is transferred from the lower housing 12 to the upper housing 14. Referring to FIG. 7, which shows the guide assembly 28 after approximately 90° of a revolution around the housings 12 and 14, line 20 has been partially transferred from the upper housing 14 to the lower housing 12, as can be seen by the position of hash mark 64 and line 22 has been partially transferred from the lower housing 12 to the upper housing 14, as can be seen by the position of hash mark 66. As shown in FIG. 8, after the guide has revolved through approximately 180°, hash mark 64 of line 20 is now located on the lower line support flange 52 of housing 12 and hash mark 66 of line 22 is now located at the apex of second pulley device 34.

Comparing the relative positions of the lines 20 and 22 as shown in FIGS. 6 and 8, it can be seen that, in FIG. 6, a majority of line 20 is wrapped in the clockwise direction around upper housing 14 and a minority of the line 20 is wrapped in the counterclockwise direction around lower housing 12. In FIG. 8, a majority of the line 20 is wrapped in the counterclockwise direction around lower housing 12 and a minority of the line 20 is wrapped in the clockwise direction around upper housing 14. Similarly, in FIG. 6, a minority of line 22 is wrapped in the counterclockwise direction around upper housing 14 and a majority of the line 22 is wrapped in the clockwise direction around lower housing 12. In FIG. 8, a majority of line 22 is wrapped in the counterclockwise direction around upper housing 14 and a minority of the line 22 is wrapped in the clockwise direction around lower housing 12.

When the upper housing 14 is rotated in the clockwise direction, the line 20 pulls the first pulley device 32 of the guide assembly 28 in the clockwise direction, and the operation of the coupling device is reversed. In this case, the line 20 is transferred from the lower housing 12 to the upper housing 14 and the line 22 is transferred from the upper housing 14 to the lower housing 12.

Therefore, it can be seen that the coupling device of the present invention enables lines to be coupled between housings that are capable of relative rotation with respect to each other. Due to the design of the particular coupling device, approximately 540° of relative rotation between the lower and upper housings 12 and 14 is possible. However, the coupling device can be configured for more or less rotation, as described below.

Figure 9:
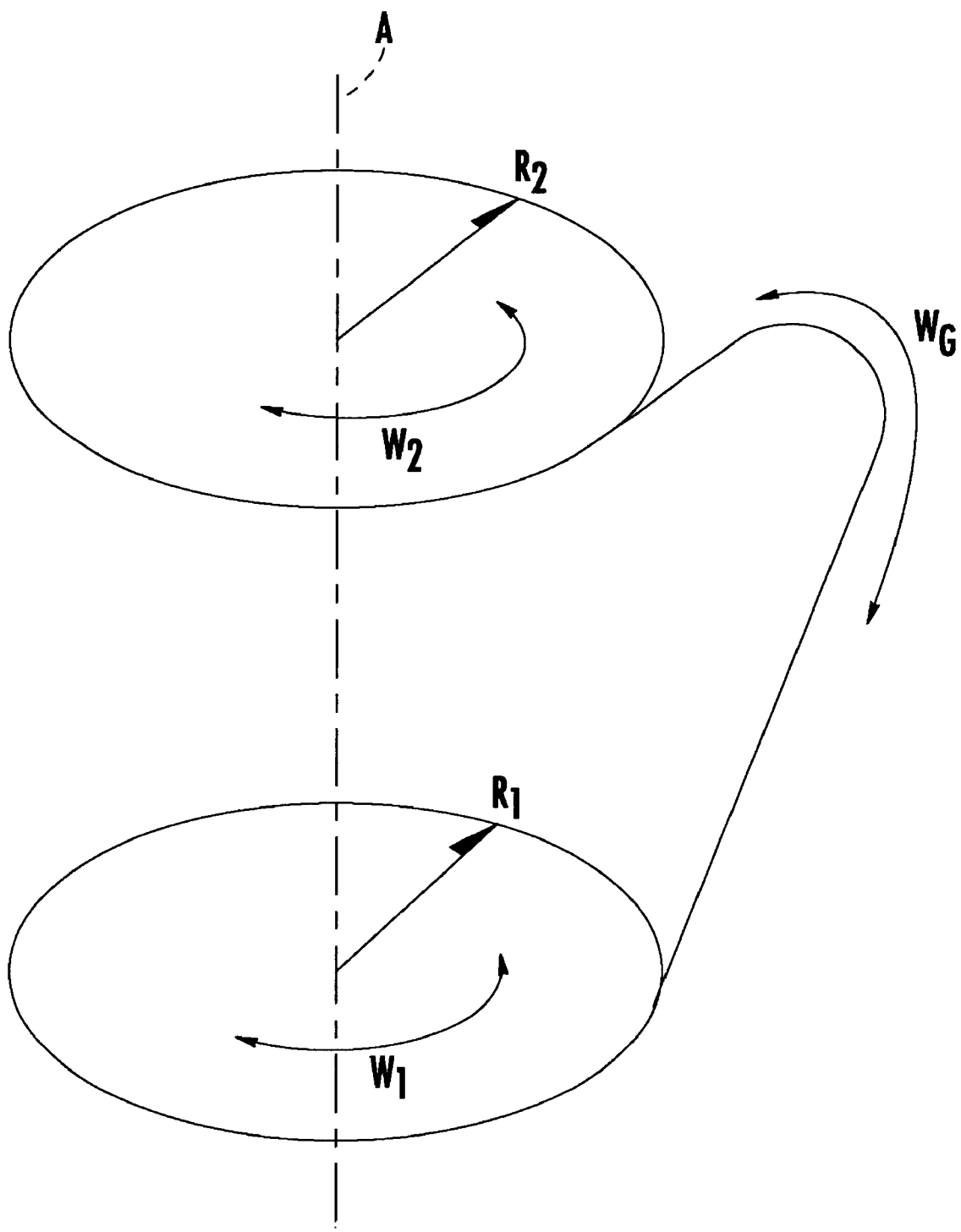
FIG. 9 is a schematic diagram which shows the parameters that define the operation of the coupling device in accordance with the present invention.

The parameters that define the operation of the coupling device 10 are shown in FIG. 9, where $R_1$ represents the radius and $\omega_1$ represents the speed of the lower housing 12, $R_2$ represents the radius and $\omega_2$ represents the speed of the upper housing 14, and $\omega_G$ represents the speed of the guide assembly 28. Therefore, $\omega_G$ is determined by the expression:

$$\omega_G = \frac{\omega_1 R_1 + \omega_2 R_2}{(R_1 + R_2)}$$

Accordingly, for the case in which $$R_1 = R_2, \omega_G = \frac{\omega_1 + \omega_2}{2}.$$

Furthermore, when housing 12 is fixed to surface 18 and $\omega_1=0$, the speed of the guide assembly 28, $\omega_G$, is $$\frac{\omega_2}{2}.$$

Since, in this case, the guide assembly 28 revolves around the housings at half the speed of the relative rotation between the lower and upper housings 12 and 14, the housings are capable of approximately 540° of relative rotation to one revolution of the guide assembly 28 around the housings 12 and 14. It is also possible, by varying the radii of the housings 12 and 14 relative to each other, to increase or decrease the total relative rotation of the housings. For example, if $$R_2 = \frac{R_1}{3},$$

$\omega_G$ would be $$\frac{\omega_2}{4},$$

thus resulting in twice the relative rotation of the housings 12 and 14, or 1080°, for every revolution of the guide assembly 28 than in the case where $R_1=R_2$.

In order to allow relative rotation of the upper and lower housings 12 and 14 on the order of several revolutions, the upper and lower housings 12 and 14 may be extended vertically to accommodate several wraps of the lines 20 and 22 around the housings, and the guide assembly 28 may include a stacking device for vertically stacking multiple wraps of the lines 20 and 22 around the upper and lower housings 12 and 14, respectively.

Figure 5A:
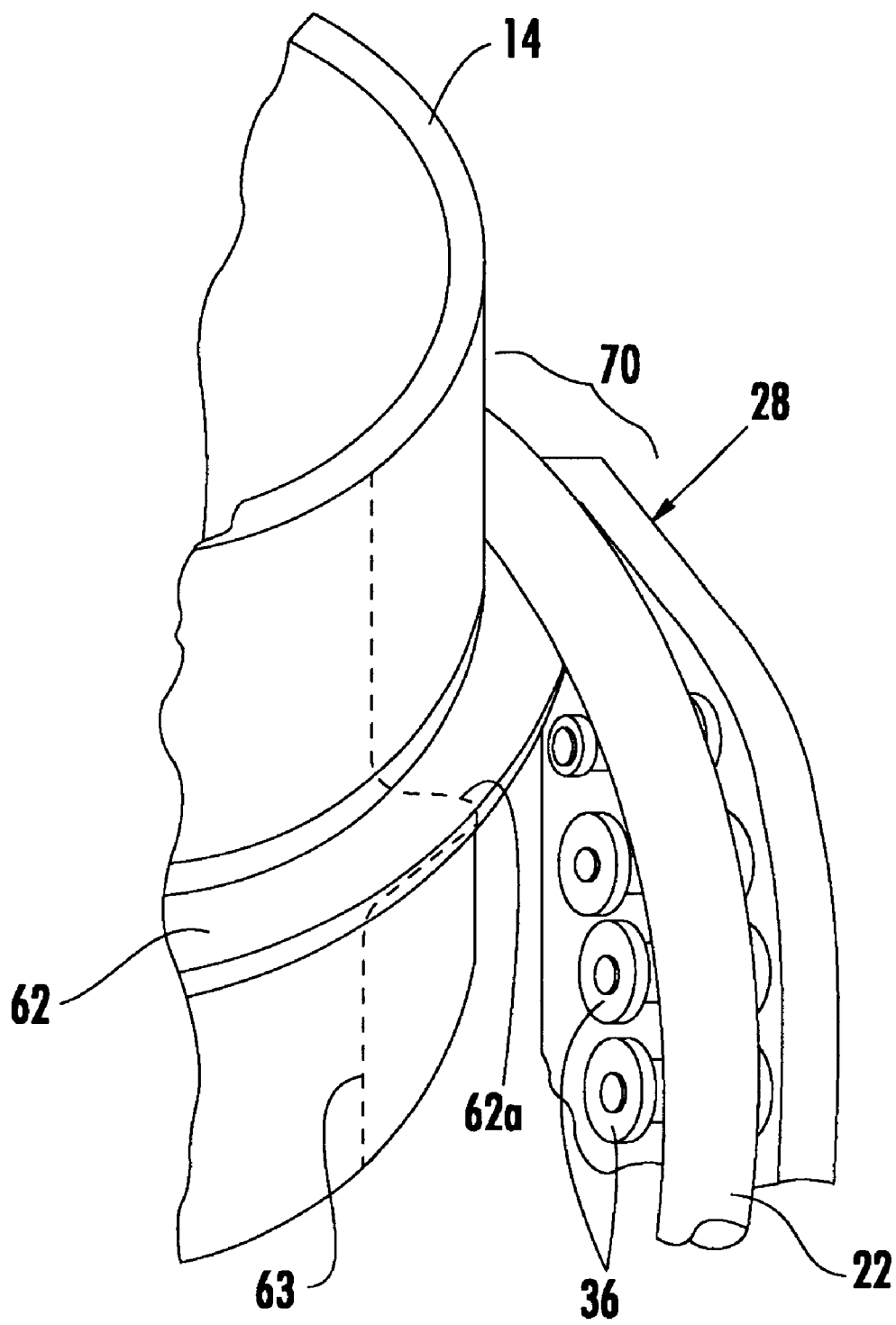
FIG. 5A is diagrammatic view of a portion of the coupling device of the present invention, as seen from line 5A—5A in FIG. 5.

Referring back to FIG. 5, a further feature of the invention will be described. In order to reduce twisting in the lines 20 and 22 as they transition from a horizontal arc around the first and second housings 12 and 14 to a vertical arc around the first and second pulley devices 32 and 34, a transition area is formed between the guide assembly and the housings. As shown in FIG. 5A, which is a diagram of a portion of the coupling device 10, as seen from line 5A—5A in FIG. 5, upper line support flange 62 includes a slight downward slope 62a, as more clearly indicated by dotted line 63, which shows the contour of the outer surface of the housing 14. Furthermore, the radius of the upper end of the second pulley device 34 is slightly increased compared to the radius at the apex 35, FIG. 5. The combination of these two features forms a transition area 70 between the horizontal arc and the vertical arc which allows the line 22 to gradually change its curvature from straight to bent or vice versa. This gradual transition reduces localized forces due to abrupt bending of the line 22 as it travels between the upper line support flange 62 and the second pulley device 34. The first pulley device 32 and the lower line support flange 60 are similarly constructed to provide a transition area for the line 20 between the first pulley device 32 and the lower line support flange 60.

Figure 10:
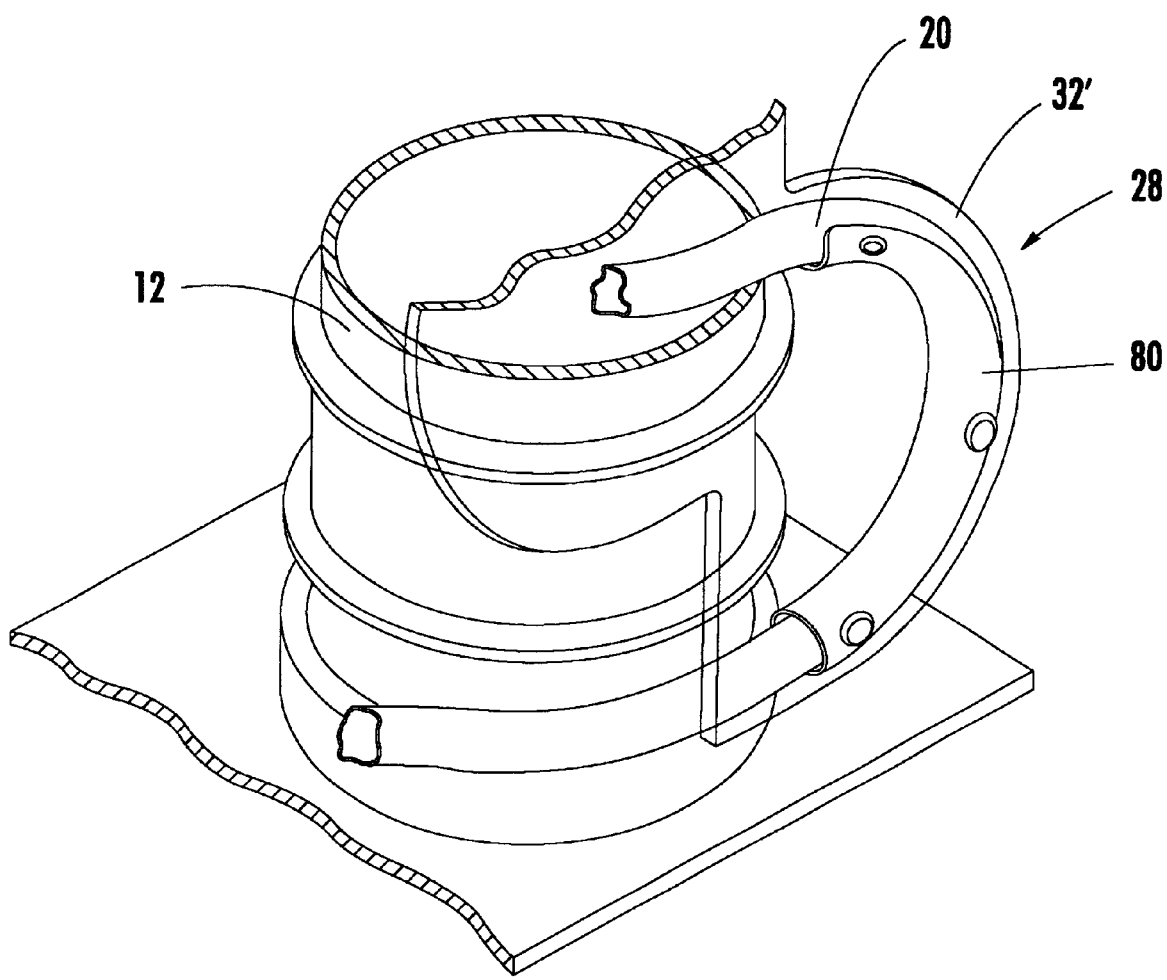
FIG. 10 is a partial perspective view of a second embodiment of the coupling device in accordance with the present invention.
Figure 11:
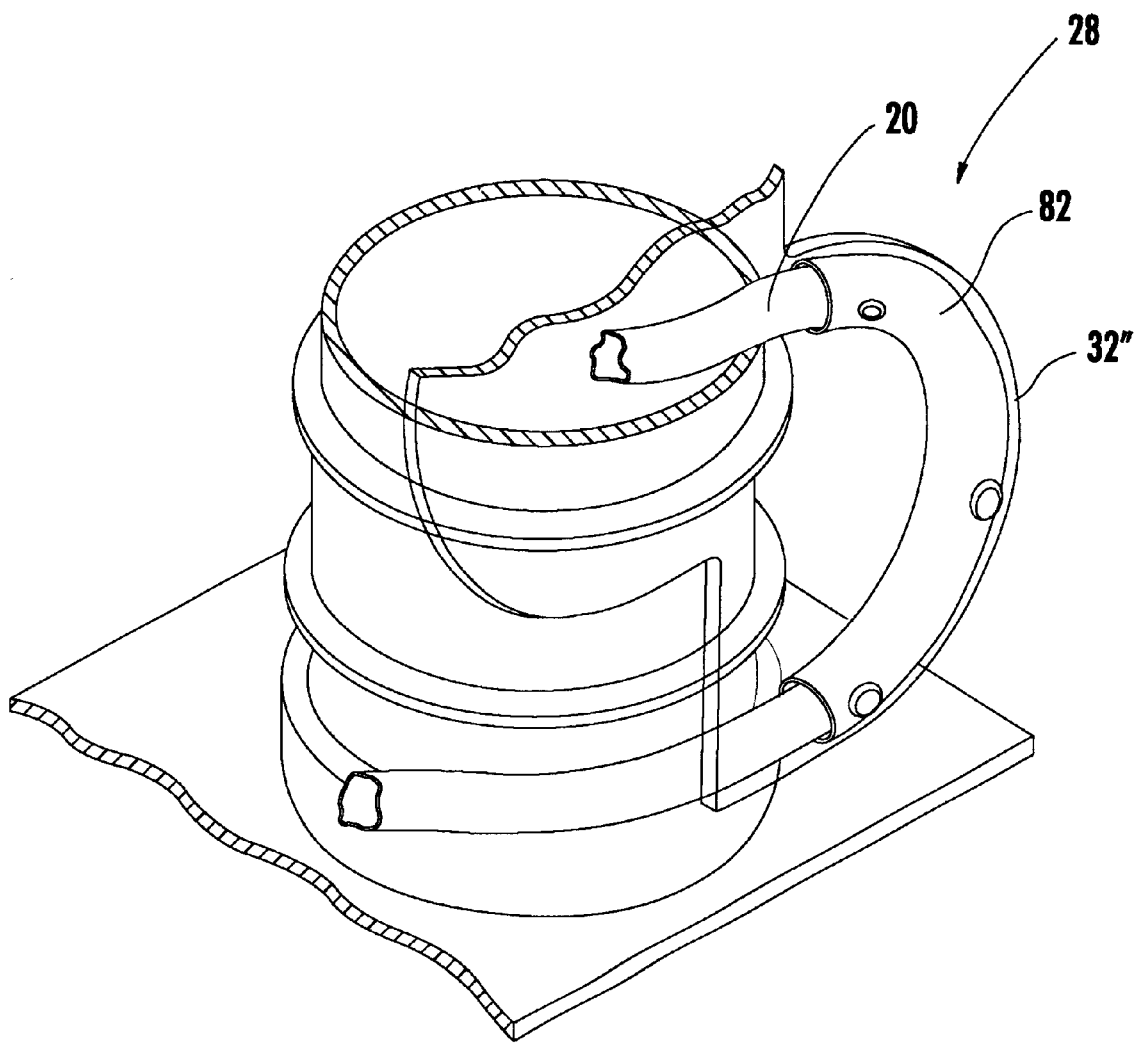
FIG. 11 is a partial perspective view of a third embodiment of the coupling device in accordance with the present invention.

Referring now to FIGS. 10 and 11, alternative embodiments of the invention will be described. As shown in FIG. 10, the first pulley device 32' of the guide assembly 28 includes an open conduit 80 on which the line 20 is slid during relative rotation of the housings. The open conduit 80 may be made from any low-friction material such as plastic. Although not shown in FIG. 10, the second pulley device may also include a similar member on which the line 22 is slid. As shown in FIG. 11, the first pulley device 32" of the guide assembly 28 includes a closed conduit 82 within which the line 20 is slid during relative rotation of the housings. Although not shown in FIG. 11, the second pulley device may also include a similar conduit in which the line 22 is slid. The closed conduit 82 also may be made from any low-friction material.

Figure 12:
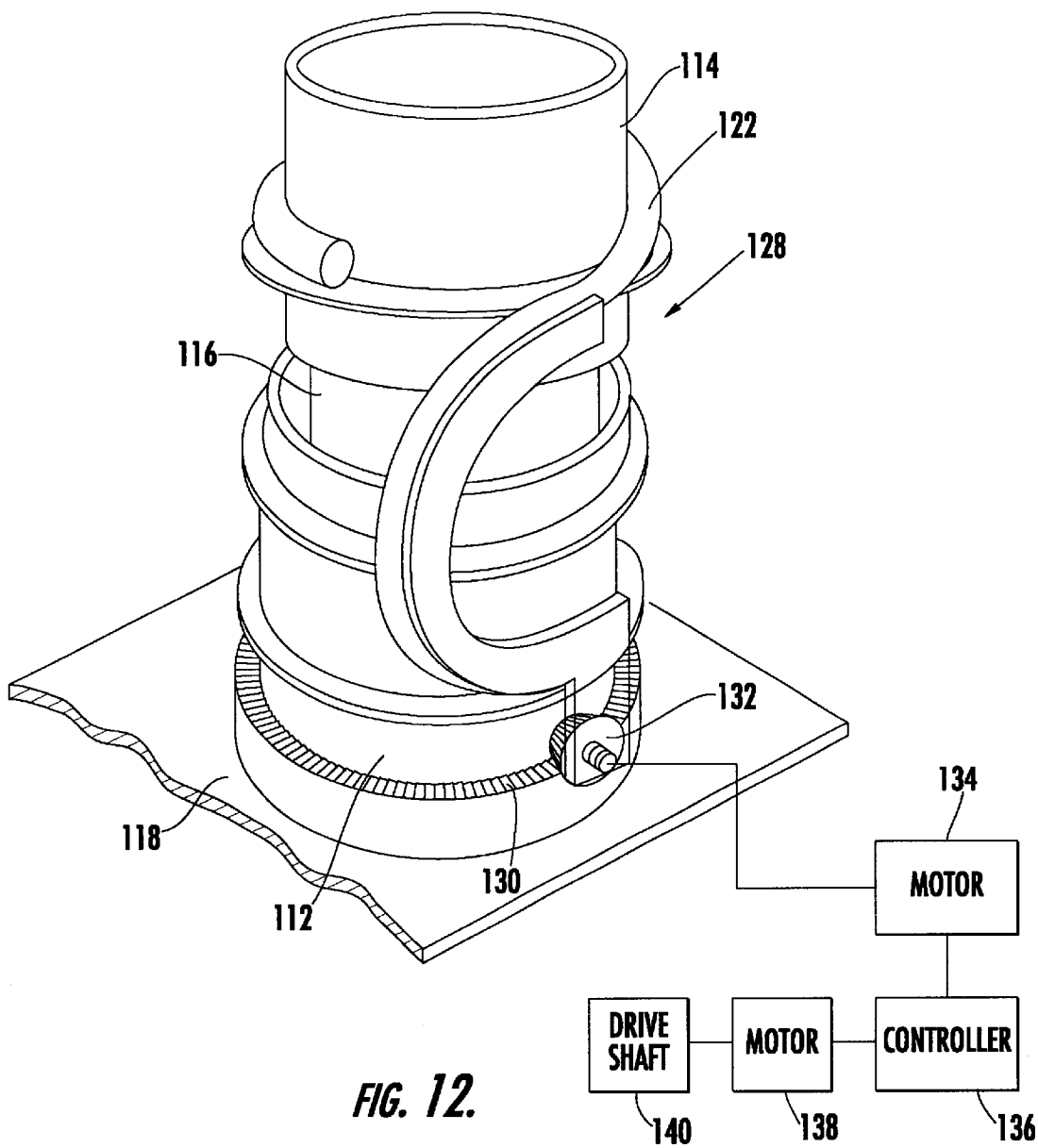
FIG. 12 is a partial schematic perspective view of a fourth embodiment of the coupling device in accordance with the present invention.

FIG. 12 is a partial schematic diagram showing another embodiment of the present invention in which only one line is coupled between upper and lower housings. A lower housing 112 is fixed to a stationary surface 118. An upper housing 114 is rotatably mounted to the lower housing 112 by a core 116. A line 122 is fixed relative to the lower and upper housings 112 and 114 and wraps around the lower housing 112 in the clockwise direction, turns 180° and wraps around the upper housing 114 in the counterclockwise direction. A guide assembly 128, shown schematically, controls the position and slack in the line 122. Lower housing 112 includes a grooved rack 130 along which a pinion gear 132, which is rotatably coupled to guide assembly 128, is driven. A motor 134 is coupled to the pinion gear 132 to drive the gear.

In this embodiment, when upper housing 114 rotates in the counterclockwise direction, line 122 pulls guide assembly 128 in the counterclockwise direction and is translated from the lower housing 112 to the upper housing 114. However, when the upper housing is turned in the clockwise direction, it is necessary to drive the guide assembly in the clockwise direction to maintain the position of the line 122 and to control the slack in line 122. Therefore, motor 134 is used to rotate pinion gear 132 in the counterclockwise direction to drive the guide assembly 128 in the counterclockwise direction, thereby translating the line 122 from the upper housing 114 to the lower housing 112 while maintaining a slack control of the line 122.

The amount of travel imparted by the gear 132 and the motor 134 to the guide assembly 128 is determined by a controller 136 which also controls a motor 138 which drives the drive shaft 140 that controls the rotation of the upper housing 14. By monitoring the relative rotation of the housings 12 and 14, the controller 136 controls the travel of the guide assembly 128 to maintain the proper amount of slack in the line 122. The proper amount of slack is an amount in which the line 122 is not so tight that it impedes the operation of the coupling device, but is not so loose that the line is not properly positioned on the guide assembly 128.

Alternatively, the controller 136 could monitor the tension in the line 122 and regulate the motor rotation in order to maintain constant tension in the line.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A coupling apparatus comprising:
   first and second relatively rotatable members;
   a first line fixed with a first of said relatively rotatable members and wrapped around it in a first direction;
   a guide revolvable about said relatively rotatable members for reversing direction of said first line to said second relatively rotatable member, said line being wrapped around said second relatively rotatable member in the opposite direction and fixed with it; and
   a drive mechanism for rotating said guide for maintaining a slack control of said line between said relatively rotatable members, wherein said drive mechanism includes a second line fixed with each of said first and second relatively rotatable members and wrapped around them in the opposite direction from said first line and said guide reverses the direction of said second line between said first and second relatively rotatable members.

2. The coupling apparatus of claim 1 in which said guide revolves at less than the speed of relative rotation between said relatively rotatable members.

3. The coupling device of claim 1 wherein said guide includes a bearing device mounted on one member.

4. The coupling device of claim 3 wherein said guide includes a second bearing device mounted on the other member.

5. The coupling device of claim 1 wherein said line includes a conduit.

6. The coupling device of claim 1 wherein said line includes a cable.

7. The coupling device of claim 1 wherein said guide includes a curved track.

8. The coupling device of claim 7 wherein said curved track is "C" shaped.

9. The coupling device of claim 7 wherein said curved track includes at least one roller.

10. The coupling device of claim 7 wherein said curved track includes a low friction element.

11. The coupling device of claim 2 wherein the speed of the guide is a function of the ratio of the radii of the first and second relatively rotatable members.

12. A coupling device comprising:
first and second relatively rotating members mounted about a common axis;
first and second lines fixed between said first and second members, said first line being adapted to wrap around said first member in a first direction and around said second member in a second direction, opposite said first direction, said second line being adapted to wrap around said first member in said second direction and around said second member in said first direction; and
a guide revolvably mounted between said first and second members for translating said first and second lines between said first member and said second member via a path tangential to and extended from said first and second members as said first and second members rotate relative to each other.

13. The coupling device of claim 12 wherein said guide includes first and second opposing pulley devices, the first pulley device translating said first line between said first and second members and said second pulley device simultaneously translating said second line between said first and second members.

14. The coupling device of claim 13 wherein said first and second pulley devices change the direction of said first and second lines respectively, as they are translated between said first and second members.

15. The coupling device of claim 12 wherein said second member rotates in said first direction relative to said first member, said guide translates said first line from said second member to said first member and said second line from said first member to said second member.

16. The coupling device of claim 15 wherein said second member rotates in said second direction relative to said first member, said guide translates said first line from said first member to said second member and said second line from said second member to said first member.

17. The coupling device of claim 12 wherein said guide revolves around said common axis at a speed which is less than the relative speed of rotation of said first and second members.

18. The coupling device of claim 12 wherein said guide includes a first bearing rotatably coupled to said first member.

19. The coupling device of claim 18 wherein said guide includes a second bearing rotatably coupled to said second member.

20. The coupling device of claim 14 wherein said first and second pulley devices each define a curved track.

21. The coupling device of claim 20 wherein each of said curved tracks include a plurality of rollers.

22. The coupling device of claim 20 wherein each of said curved tracks include a curved element having a low-friction surface in contact with its associated line.

23. The coupling device of claim 20 wherein each of said curved tracks comprise a conduit for receiving one of said first and second lines.

24. The coupling device of claim 17 wherein the speed of the guide is a function of the ratio of the radii of the first and second relatively rotatable members.

25. A coupling device comprising:
first and second relatively rotating members mounted to rotate about a common axis;
a first line fixed between said first and second members, said first line being adapted to wrap around said first member in a first direction and around said second member in a second direction, opposite said first direction;
a guide revolvably mounted to said first and second members for translating said first line between said first and second members via a path tangential to and extended from said first and second members, as said first and second members rotate relative to each other; and
a drive mechanism for revolving said guide around said common axis at a rate which is less than the relative rate of rotation of said first and second members.

26. The coupling device of claim 25 wherein said guide reverses the direction of the first line from the first direction to the second direction as it translates the first line from the first member to the second member.

27. The coupling device of claim 26 wherein said drive mechanism includes a second line fixed between said first and second members, said second line being adapted to wrap around said first member in said second direction and around said second member in said first direction, said guide translating said second line between said first and second members as said first and second members rotate relative to each other.

28. The coupling device of claim 27 wherein said guide reverses the direction of the second line from the second direction to the first direction as it translates the second line from the first member to the second member.

29. The coupling device of claim 28 wherein said guide includes a first bearing rotatably coupled to said first member.

30. The coupling device of claim 29 wherein said guide includes a second bearing rotatably coupled to said second member.

31. The coupling device of claim 29 wherein said first and second lines include first and second conduits.

32. The coupling device of claim 29 wherein said first and second lines include first and second cables.

33. The coupling device of claim 26 wherein said guide includes a first pulley device for reversing the direction of the first line.

34. The coupling device of claim 28 wherein said guide includes opposing pulley devices for simultaneously reversing the direction of the first and second lines.

35. The coupling device of claim 33 wherein said pulley device includes a curved track.

36. The coupling device of claim 35 wherein said curved track is C-shaped.

37. The coupling device of claim 35 wherein said curved track includes a number of rollers.

38. The coupling device of claim 35 wherein said curved track includes a curved element having a low-friction surface in contact with said first line.

39. The coupling device of claim 35 wherein said curved track includes a conduit for receiving said first line.

40. The coupling device of claim 25 wherein said first line includes a hose.

41. The coupling device of claim 25 wherein said first line includes a cable.

42. The coupling device of claim 34 wherein said pulley devices include opposing curved paths.

43. The coupling device of claim 42 wherein said curved tracks are C-shaped.

44. The coupling device of claim 42 wherein each of said curved path includes a plurality of rollers.

45. The coupling device of claim 42 wherein each of said curved paths includes a curved element having a low-friction surface in contact with its associated line.

46. The coupling device of claim 42 wherein each of said curved paths includes a conduit for receiving one of said first and second lines.

47. The coupling device of claim 25 wherein said first and second members each include a flange for supporting said first line as it is wrapped around said first and second members.

48. The coupling device of claim 25 wherein the rate of revolution of said guide is a function of the ratio of the radii of the first and second relatively rotatable members.

49. A coupling device comprising:
first and second relatively rotating members mounted about a common axis;
first and second lines fixed between said first and second members, said first line being adapted to wrap around said first member in a first direction and around said second member in a second direction, opposite said first direction, said second line being adapted to wrap around said first member in said second direction and around said second member in said first direction;
a guide revolvably mounted between said first and second members for translating said first and second lines between said first member and said second member as said first and second members rotate relative to each other;
said guide including first and second opposing pulley devices, the first pulley device translating said first line between said first and second members and said second pulley device simultaneously translating said second line between said first and second members;
wherein said first and second pulley devices change the direction of said first and second lines respectively, as they are translated between said first and second members and said first and second pulley devices each defining a curved track; and
each of said curved tracks comprising a conduit for receiving one of said first and second lines.

50. A coupling device comprising:
first and second relatively rotating members mounted to rotate about a common axis;
a first line fixed between said first and second members, said first line being adapted to wrap around said first member in a first direction and around said second member in a second direction, opposite said first direction;
a guide revolvably mounted to said first and second members for translating said first line between said first and second members, as said first and second members rotate relative to each other;
a drive mechanism for revolving said guide around said common axis at a rate which is less than the relative rate of rotation of said first and second members;
wherein said guide reverses the direction of the first line from the first direction to the second direction as it translates the first line from the first member to the second member; and
wherein said drive mechanism includes a second line fixed between said first and second members, said second line being adapted to wrap around said first member in said second direction and around said second member in said first direction, said guide translating said second line between said first and second members as said first and second members rotate relative to each other.

51. The coupling device of claim 50 wherein said guide reverses the direction of the second line from the second direction to the first direction as it translates the second line from the first member to the second member.

52. A The coupling device of claim 51, wherein said guide includes a first bearing rotatably coupled to said first member.

53. The coupling device of claim 52 wherein said guide includes a second bearing rotatably coupled to said second member.

54. The coupling device of claim 52 wherein said first and second lines include first and second conduits.

55. The coupling device of claim 52 wherein said first and second lines include first and second cables.

56. The coupling device of claim 51 wherein said guide includes opposing pulley devices for simultaneously reversing the direction of the first and second lines.

57. A coupling device comprising:
first and second relatively rotating members mounted to rotate about a common axis;
a first line fixed between said first and second members, said first line being adapted to wrap around said first member in a first direction and around said second member in a second direction, opposite said first direction;
a guide revolvably mounted to said first and second members for translating said first line between said first and second members, as said first and second members rotate relative to each other;
a drive mechanism for revolving said guide around said common axis at a rate which is less than the relative rate of rotation of said first and second members;
wherein said guide reverses the direction of the first line from the first direction to the second direction as it translates the first line from the first member to the second member and said guide includes a first pulley device for reversing the direction of the first line;
said pulley device including a curved track; and
said curved track including a conduit for receiving said first line.

58. A coupling device comprising:
first and second relatively rotating members mounted to rotate about a common axis;

a first line fixed between said first and second members, said first line being adapted to wrap around said first member in a first direction and around said second member in a second direction, opposite said first direction;

a guide revolvably mounted to said first and second members for translating said first line between said first and second members, as said first and second members rotate relative to each other;

a drive mechanism for revolving said guide around said common axis at a rate which is less than the relative rate of rotation of said first and second members;

wherein said drive mechanism includes a second line fixed between said first and second members, said second line being adapted to wrap around said first member in said second direction and around said second member in said first direction, said guide translating said second line between said first and second members as said first and second members rotate relative to each other;

wherein said guide reverses the direction of the first line from the first direction to the second direction as it translates the first line from the first member to the second member and reverses the direction of the second line from the second direction to the first direction as it translates the second line from the first member to the second member and includes opposing pulley devices for simultaneously reversing the direction of the first and second lines; and said pulley devices including opposing curved paths.

59. The coupling device of claim 58, wherein said guide includes curved tracks that are C-shaped.

60. The coupling device of claim 58 wherein each of said curved paths includes a plurality of rollers.

61. The coupling device of claim 58 wherein each of said curved paths includes a curved element having a low-friction surface in contact with its associated line.

62. The coupling device of claim 58 wherein each of said curved paths includes a conduit for receiving one of said first and second lines.

* * * * *